Aug. 8, 1950     O. H. LUNDA     2,517,583
VALVE TOOL
Filed July 9, 1947
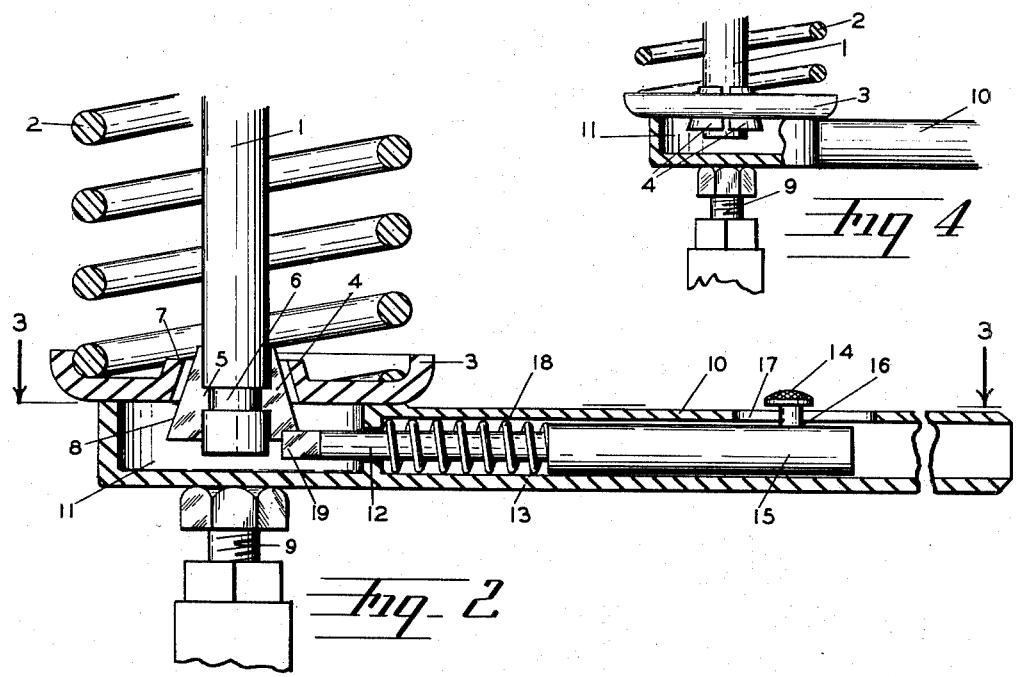
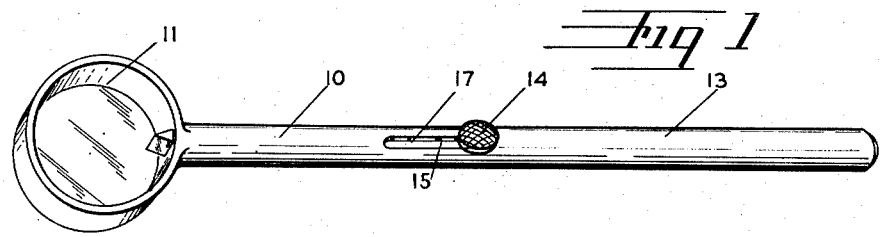
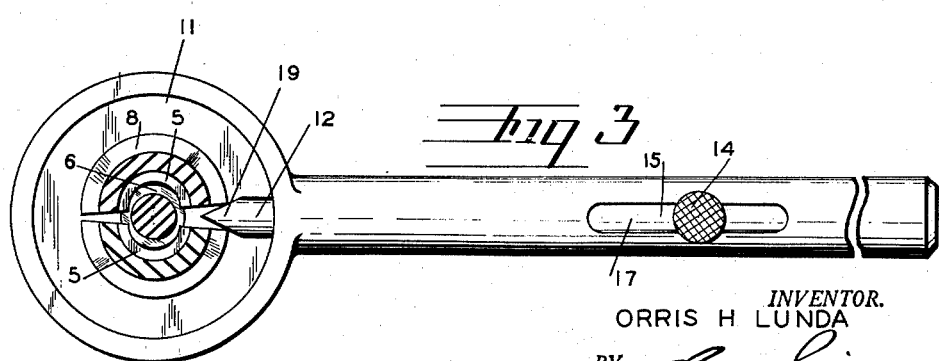
INVENTOR.
ORRIS H. LUNDA
BY
ATTORNEY Patented Aug. 8, 1950

2,517,583

UNITED STATES PATENT OFFICE 2,517,583

VALVE TOOL

Orris H. Lunda, Salem, Oreg.

Application July 9, 1947, Serial No. 759,799

1 Claim. (Cl. 29—249)

This invention relates to valve tools and is particularly adapted for removing and catching valve keepers when the valve assembly is being dismantled.

The primary object of the invention is to provide a tool that can be inserted underneath the valve and spring assembly of combustion engines, said tool assisting in the removing and catching of the keepers to prevent them from being lost or dropped down into the motor.

These and other incidental objects will be apparent in the drawings, specifications and claim.

Referring to the drawings:

Figure 1 is a plan perspective view of my new and improved valve tool.

Figure 2 is a fragmentary sectional view of a conventional valve stem and spring washer with keepers, having my new and improved valve tool applied thereto.

Figure 3 is a plan sectional view taken on line 3—3 of Figure 2, illustrating how the keepers are forcibly removed by the tool.

Figure 4 is a side view of the lower end of the valve stem and washer with keepers in place showing my valve tool inserted thereunder and resting upon the valve tappet.

In the drawings:

The conventional valve stem is indicated at 1, the valve spring at 2 and the spring retaining washer at 3, the said washer being maintained on the stem 1 by the keepers 4. The keepers 4 are cone shaped and have the annular tongues 5 for fitting into the groove 6 of the stem 1. These keepers are made in pairs so that they may be applied to opposite sides of the stem, best illustrated in Figure 3.

The tapered hole 7 of the washer 3 rests on the outer cone surface 8 of the keepers and maintains them in engagement with the stem, best illustrated in Figure 2. While this is the type of keeper I illustrate with my invention, I do not wish to be limited to this particular type of keeper as there are various types for use with which my new and improved valve tool is admirably adapted.

In Figure 4 I illustrate the tool inserted between the valve tappet 9 and the washer 3. In many cases, the tapered surfaces 7 and 8 of the keepers and washer become stuck together. Therefore, while the tool 10 is inserted in the position shown in Figure 4, the washer 3, and the stem 1, are raised by the bowl 11 of the tool. Then by striking the valve on its top, the tapered surfaces 7 and 8 will be released from one another as illustrated in Figure 2.

The washer 3 is next raised by the valve lifter, not here shown, and the keepers ordinarily will fall into the bowl or pan 11 of the valve tool 10, but in the event the keepers are stuck to the valve I have provided a plunger 12 slidably mounted within the handle 13 and operated by the knob 14, said knob being threadably connected to the rear 15 of the plunger 12 at 16 and operating in the slot 17 of the handle 13.

The plunger is maintained in retracted position, as shown in Figure 1, by the spring 18, and when it becomes necessary to forcibly remove the keepers 4 the operator of the tool pushes the knob 14 forward, pushing the bevelled end or wedge 19 of the plunger between the adjacent edges of the keepers and spreading them so that they are removed from the valve stem.

As hereinbefore stated, the primary object of the invention is to provide a tool that will catch and hold the keepers of valve assemblies and at the same time lend assistance in the removal of the keepers by holding the washer of the valve assembly in a raised position relative to the tappet while the operator strikes the valve loosening the keeper assembly, and then providing means of removing the keepers after the washer has been raised from the said keepers.

I do not wish to be limited to the exact mechanical structure as other mechanical equivalents may be substituted still coming within the scope of my claim.

What I claim is:

A tool for removing the keepers of a valve assembly, comprising a pan-like receptacle having a substantially flat solid bottom with an upstanding continuous side wall, a hollow handle extending radially from the side wall of the receptacle, an aperture in the side wall of said receptacle and axially of said handle for communication therewith, said aperture being of smaller diameter than the interior of said handle, a rod slidable within said handle and having a plunger of reduced diameter extending axially from said rod and slidable through said aperture, a wedge formed on the free end of said plunger with the leading edge of said wedge extending perpendicularly from the bottom of said receptacle, a spring in said handle surrounding said plunger and compressed between said rod and the receptacle wall surrounding said aperture to bias said rod to withdraw said wedge from said receptacle, a slot extending longitudinally in said handle, and a manually operable knob fixed to said rod and extending through said slot to retain said wedge in proper angular relationship and to enable the sliding of said wedge into said receptacle for separating the keepers on the valve stem.

ORRIS H. LUNDA.

REFERENCES CITED

The following references are of record in the file of this patent:

UNITED STATES PATENTS

| Number | Name | Date |
|---|---|---|
| 1,934,973 | Frye | Nov. 14, 1933 |

FOREIGN PATENTS

| Number | Country | Date |
|---|---|---|
| 305,815 | Great Britain | Feb. 14, 1929 |
| 532,423 | Great Britain | Jan. 23, 1941 |